United States Patent
Browning et al.

(10) Patent No.: US 6,732,138 B1
(45) Date of Patent: May 4, 2004

(54) METHOD AND SYSTEM FOR ACCESSING SYSTEM RESOURCES OF A DATA PROCESSING SYSTEM UTILIZING A KERNEL-ONLY THREAD WITHIN A USER PROCESS

(75) Inventors: Luke Matthew Browning, Austin, TX (US); Jeffrey Scot Peek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/506,733

(22) Filed: Jul. 26, 1995

(51) Int. Cl.[7] .................................................. G06F 9/46
(52) U.S. Cl. .................... 709/102; 709/107; 709/108
(58) Field of Search ................................ 395/672, 673, 395/674; 709/102, 107, 108

(56) References Cited

U.S. PATENT DOCUMENTS

| | | |
|---|---|---|
| 4,754,395 A | 6/1988 | Weisshaar et al. |
| 5,109,515 A | 4/1992 | Laggis et al. |
| 5,129,086 A | 7/1992 | Coyle, Jr. et al. |
| 5,136,712 A | 8/1992 | Perazzoli, Jr. et al. |
| 5,148,544 A | 9/1992 | Cutler et al. |
| 5,179,702 A | 1/1993 | Spix et al. |
| 5,305,455 A | 4/1994 | Anschuetz et al. |
| 5,319,782 A | 6/1994 | Goldberg et al. |
| 5,339,415 A | 8/1994 | Strout, II et al. |
| 5,345,587 A | 9/1994 | Fehskens et al. |

OTHER PUBLICATIONS

Oikawa et al, User Level Real–Time Threads, IEEE 1994.*
Inohara et al, A Thread Facility Based On User/Kernel Cooperation In The Xero Operating System, IEEE 1991.*
Govindan et al, Scheduling and IPC Mechanisms for Continuous Media, ACM 1991.*
Anderson et al, Scheduler Activations: Effective Kernel Support for the User Level Management of Parallelism, ACM 1991.*

* cited by examiner

Primary Examiner—Lucien U. Toplu
(74) Attorney, Agent, or Firm—Diana L. Roberts; Bracewell & Patterson, L.L.P.

(57) ABSTRACT

A method and system are disclosed for managing access to system resources by a user process within a multitasking data processing system. The data processing system includes a processor for executing kernel threads scheduled to the processor and a memory having a user address space which stores an application program and a kernel address space which stores an operating system kernel. The operating system kernel includes a kernel process comprising one or more first kernel threads which can each access the system resources. The user address space also stores a user process which has ownership of the system resources. The user process includes a second kernel thread comprising instructions within the application program. To access certain system resources, the second kernel thread invokes a first kernel thread within the user process. A thread scheduler schedules selected ones of the one or more first kernel threads and the second kernel thread to the processor for execution, such that access to the system resources by the user process is accomplished by invoking a kernel thread within the user process without invoking a kernel thread within the kernel process.

18 Claims, 4 Drawing Sheets

METHOD AND SYSTEM FOR ACCESSING SYSTEM RESOURCES OF A DATA PROCESSING SYSTEM UTILIZING A KERNEL-ONLY THREAD WITHIN A USER PROCESS

BACKGROUND OF THE INVENTION

1. Technical Field

The present invention relates in general to a method and system for data processing and in particular to an improved method and system for accessing system resources within a multitasking data processing system. Still more particularly, the present invention relates to a method and system for accessing system resources within a multitasking data processing system which implements a multithreaded operating system kernel that supports kernel-only threads within user processes.

2. Description of the Related Art

A number of currently available multitasking operating systems such as AIX (Advanced Interactive Executive) enable multiple application programs to concurrently execute and share system resources within a data processing system. Typically, each application program comprises one or more processes, which are entities allocated system resources by the operating system. The operating system itself includes a lowest layer, called a kernel, which interacts with the data processing system's hardware. Like application programs, the kernel comprises multiple processes, which synchronize various system activities, implement multiprocessing capabilities, dispatch process threads, and provide interrupt handling services to device drivers.

Referring now to FIG. 4, there is depicted a conceptual diagram of conventional user and kernel processes within a data processing system. As illustrated, a multitasking data processing system concurrently executes multiple user processes 100, which are each allocated a distinct user address space as well as ownership of other system resources. Each user process 100 comprises one or more user threads 102. As will be understood by those skilled in the art, user threads 102 are abstract entities within the portable programming model for which an application designer writes code. Each user thread 102 is mapped to one or more kernel threads 104 in an implementation dependent manner.

Kernel threads 104 are schedulable entities that execute program steps and consume system resources owned by the processes which include kernel threads 104. Each kernel thread 104 has an associated machine state that consists of the processor register contents, program counter, and other privileged information required to execute kernel thread 104. Multiple kernel threads 104 can execute simultaneously when multiple CPUs are available. When only a single CPU is available, the operating system allocates CPU time slices to each of kernel threads 104 to create an appearance of concurrent execution.

As described above, the operating system kernel includes multiple concurrent kernel processes 106. Each kernel process 106 represents a registered segment of code available to support a function of the data-processing system. For example, the operating system of a data processing system typically includes a number device drivers utilized to manage devices coupled to the system bus of the data processing system. Each of kernel processes 106 can be utilized by the operating system to provide services, such as interrupt handling, for these device driver routines. As illustrated, kernel threads 107, which form kernel processes 106, execute only within a kernel mode environment. Both kernel process kernel threads 107 and user process kernel threads 104 can reference the globally accessible kernel data structures utilized to control operation of the data processing system and to define system resources allocated to each user process 100.

While a kernel thread 104 running under a user process 100 is executing application instructions, kernel thread 104 operates within a user mode environment. However, during its stream of execution, a kernel thread 104 may require access to system resources, for example, to perform a disk read or other asynchronous I/O, which are accessible only from the kernel mode environment. To access these system resources, kernel thread 104 first describes the desired I/O operation utilizing a control block data structure within the user address space assigned to user process 100. In addition, kernel thread 104 specifies whether a notification signal should be issued to kernel thread 104 when the requested data is available. Kernel thread 104 then makes a system call to change domains from the user mode to the kernel mode environment.

Within the kernel mode environment, kernel thread 104 makes a kernel service call to the kernel address space, as illustrated by arrow 108, requesting that a kernel thread 107 running under a kernel process 106 perform the access to the system resources. The kernel service call entails allocating a control block within the kernel address space, filling out the control block, and inserting the control block into the kernel process request queue. Following kernel service call 108, kernel thread 104 returns to the user mode environment and continues execution.

Upon receipt of kernel service call 108, a kernel thread 107 which supports the requested functionality wakes from sleep, that is, a state of suspended execution, and moves the control block from the kernel process request queue to a pending I/O queue. In the case of an asynchronous read, kernel thread 107 then interfaces with a device driver routine to initiate an access to the disk hardware, as illustrated by arrow 112. Data read from the disk is stored within the global kernel address space. While waiting for the I/O request to complete, kernel thread 107 sleeps unless other I/O requests serviced by kernel thread 107 are received. Upon completion of the requested asynchronous read, kernel thread 107 is awakened by an interrupt from the disk interrupt handler, indicating that an asynchronous read has completed.

After kernel thread 107 wakes, kernel thread 107 determines which I/O request has been completed. Kernel thread 107 then copies the data from the kernel address space to the address space of user process 100. Because kernel thread 107 runs under a different process from the calling kernel thread 104, kernel thread 107 must obtain locks on a portion of the address space of user process 100 to ensure that the address space is not reallocated before the data transfer is complete. Once the data is copied into the user address space of user process 100, kernel thread 107 updates a status indicator within the control block of user process 100 to indicate that the requested data is available. In addition, if requested by user process 100, kernel process 106 transmits a signal to user process 100 to indicate that the requested data is available. Kernel process 106 then returns to sleep. After receiving notification of the availability of the requested data from kernel process 106 or by checking the status indicator within its control block, kernel thread 104 can then utilize the accessed data in its stream of execution.

Although the programming model illustrated conceptually in FIG. 4 provides enhanced performance over prior programming models which did not support multithreaded processes, the programming model depicted in FIG. 4 does not promote accountability for the use of system services by user processes 100. In other words, each user process 100 can consume system resources available through kernel processes 106 without regard to the priority of user process 100 since kernel processes 106 provide generic response to kernel service calls issued by kernel threads 104. Because of the generic support provided by kernel processes 106, kernel service calls issued by a high priority kernel thread 104 running under a user process 100 can be delayed in favor of a call issued by a lower priority kernel thread 104. In addition, when kernel threads running under multiple user processes 100 request a particular system resource accessible only through a single kernel process 106, the programming model illustrated in FIG. 4 requires that all of the kernel service calls be placed within a single kernel process request queue. Furthermore, it is often desirable that kernel threads 107 which access system resources in kernel mode retain the attributes of the calling kernel thread 104. The programming model depicted in FIG. 4, however, does not enable kernel threads 107 running under kernel processes 106 to inherit the attributes of calling kernel threads 104 running under a user processes 104.

Consequently, it would be desirable to provide an improved method and system for accessing system resources within a multitasking data processing system.

SUMMARY OF THE INVENTION

It is therefore one object of the present invention to provide an improved method and system for data processing.

It is another object of the present invention to provide an improved method and system for accessing system resources within a multitasking data processing system.

It is yet another object of the present invention to provide an improved method and system for accessing system resources within a multitasking data processing system which implements a multithreaded operating system kernel that supports kernel-only threads within user processes.

The foregoing objects are achieved as is now described. A method and system are disclosed for managing access to system resources by a user process within a multitasking data processing system. The data processing system includes a processor for executing kernel threads scheduled to the processor and a memory having a user address space which stores an application program and a kernel address space which stores an operating system kernel. The operating system kernel includes a kernel process comprising one or more first kernel threads which can each access the system resources. The user address space also stores a user process which has ownership of the system resources. The user process includes a second kernel thread comprising instructions within the application program. To access certain system resources, the second kernel thread invokes a first kernel thread within the user process. A thread scheduler schedules selected ones of the one or more first kernel threads and the second kernel thread to the processor for execution, such that access to the system resources by the user process is accomplished by invoking a kernel thread within the user process without invoking a kernel thread within the kernel process.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
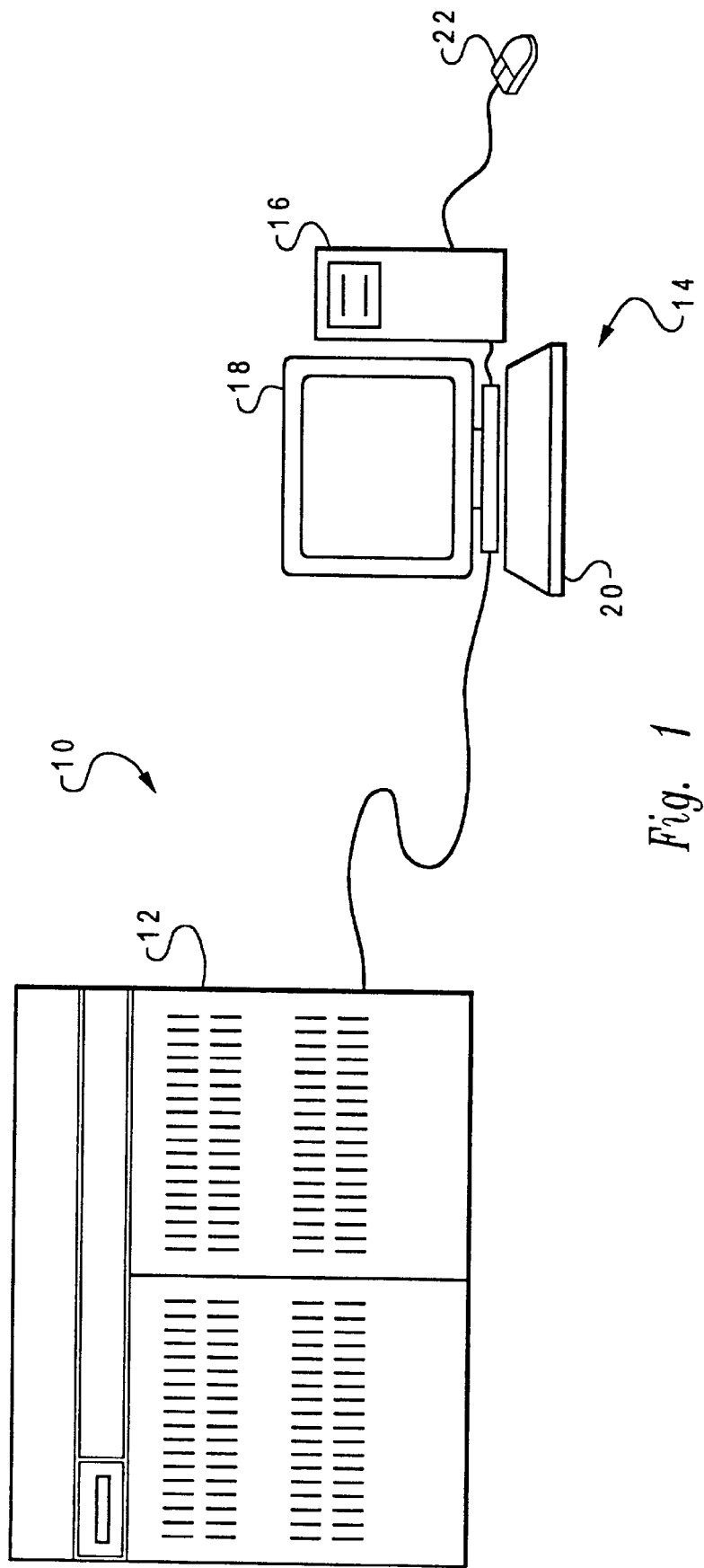
FIG. 1 illustrates a preferred embodiment of a data processing system which employs the method and system of the present invention.

With reference now to the figures and in particular with reference to FIG. 1, there is illustrated a preferred embodiment of a data processing system employing the method and system of the present invention. As illustrated, data processing system 10 comprises system unit 12 and one or more local nodes 14, which include personal computer 16, display 18, keyboard 20, and mouse 22. As is well-known to those skilled in the art, a user inputs data to personal computer 16 utilizing keyboard 20, mouse 22, or other suitable input device. The user may then process the data locally utilizing personal computer 16, or transmit the data from personal computer 16 to system unit 12 or another node 14 utilizing well-known networking techniques. It is advantageous for a user to send tasks to system unit 12 for execution since system unit 12 can execute tasks in a relatively short period of time compared to node 14. System unit 12 and personal computer 16 output data to a user via display device 18.

Figure 2:
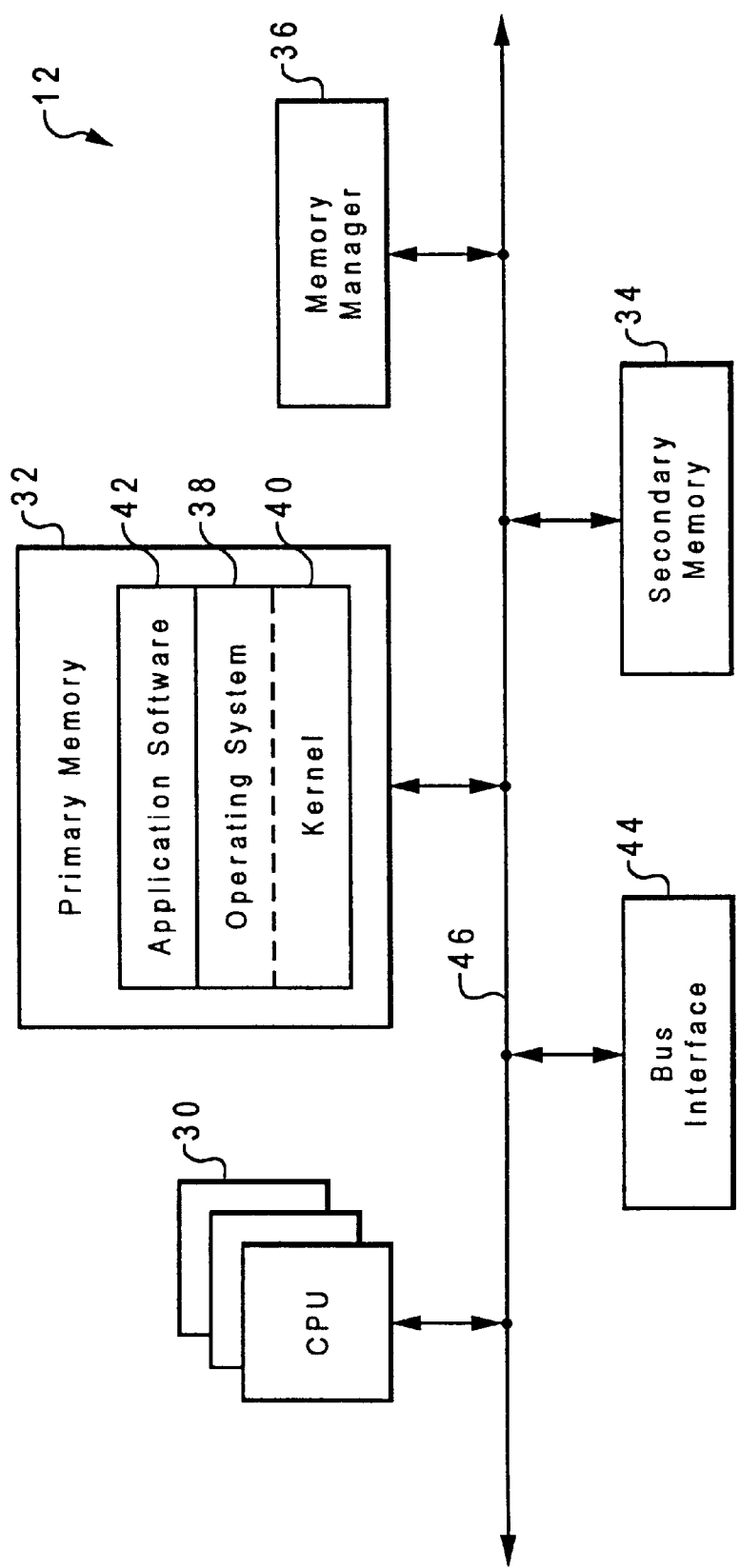
FIG. 2 depicts a block diagram of the system unit of the data processing system illustrated in FIG. 1.

Referring now to FIG. 2, there is depicted a block diagram of system unit 12, which comprises a multitasking multiprocessor computer, such as the IBM RISC System/6000. System unit 12 includes one or more CPUs 30, which are each capable of executing a thread within one of a number of concurrent multithreaded processes. As is typical in multitasking data processing systems, each user process executing within system unit 12 is allocated its own virtual memory space which is mapped partially into high speed primary memory 32 and partially into lower speed secondary memory 34 by memory manager 36.

The operation of system unit 12 and the allocation of system resources to the processes executing system unit 12 is controlled by operating system 38, which in a preferred embodiment of the present invention comprises AIX. For the purpose of the present discussion, it is assumed that operating system 38 is resident within primary memory 32, although those skilled in the art will appreciate that certain infrequently utilized segments of operating system 38 may be swapped out to secondary memory 34 by memory manager 36. Operating system 38 includes kernel 40 which comprises the lowest layer of operating system 38 that interacts most directly with the hardware of system unit 12. Kernel 40 dispatches kernel threads to CPUs 30 for execution, provides services to device drivers interfacing with hardware within system unit 12, and implements system services, memory management, network access, and the file system utilized by system unit 12. In addition to kernel 40, primary memory 32 also stores frequently utilized segments of application software 42. As is well-known to those skilled in the art, application software 42 communicates with operating system 38 through an Application Programming Interface (API).

System unit 12 also includes bus interface 44 through which multiple nodes 14 can interface to system resources available within system unit 12. As will be appreciated by those skilled in the art, system unit 12 includes additional hardware coupled to system bus 46 that is not necessary for an understanding of the present invention and is accordingly omitted for simplicity.

Figure 3:
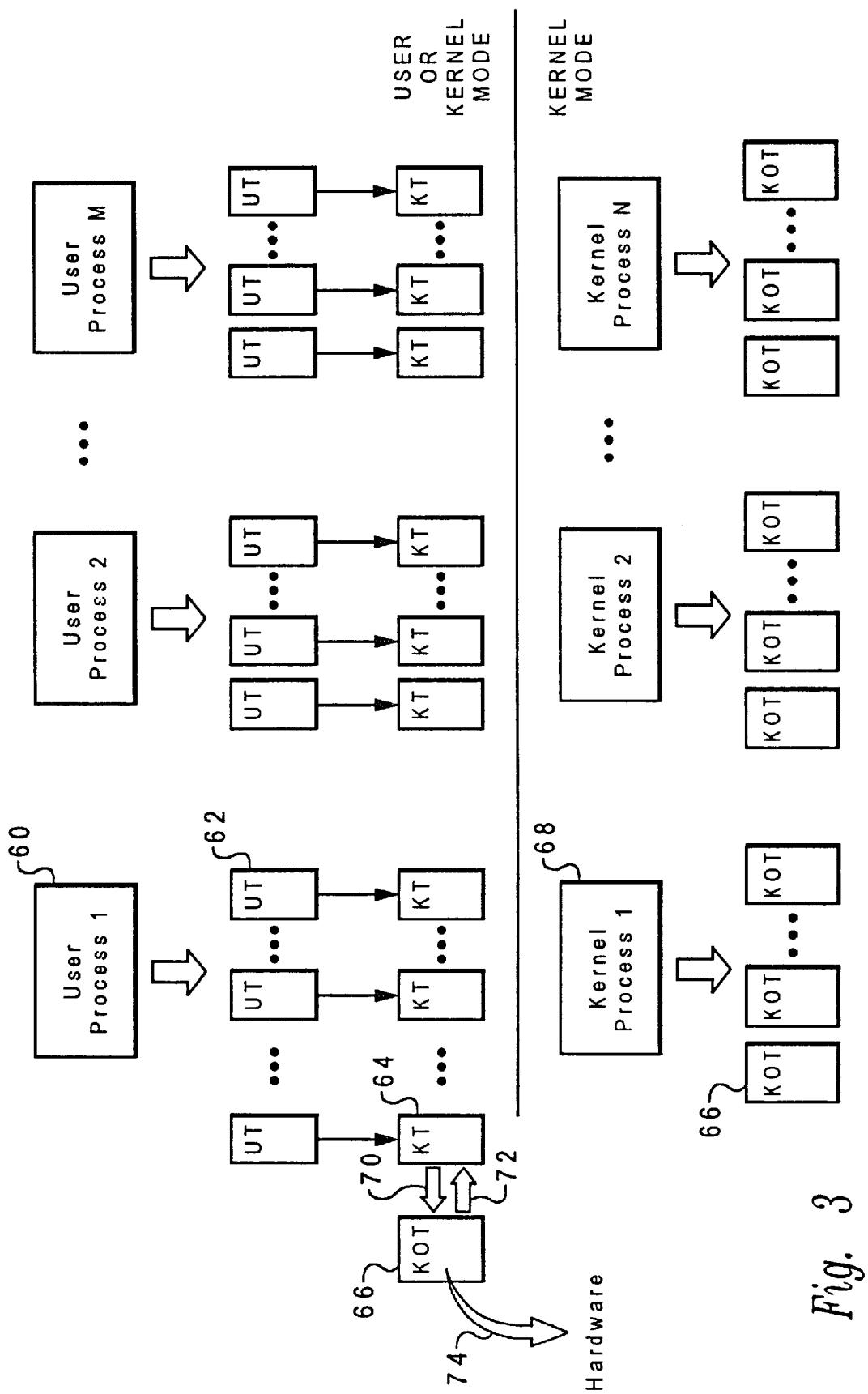
FIG. 3 illustrates the conceptual programming model employed by the present invention.

With reference now to FIG. 3, there is illustrated a conceptual block diagram of the programming model employed by the present invention. Like the conventional programming model depicted in FIG. 4, the programming model utilized by the present invention supports multiple user processes 60 which are created by operating system 38 upon initiation of application software 42. Each user process 60 has an associated set of attributes which includes process privileges and a process priority. As described above, processes including user processes 60 and kernel processes 68 are the entities to which virtual memory address space and system resources are assigned. Each user process 60 is comprised of one or more user threads 62, which in a preferred embodiment of the present invention comprise POSIX (Portable Operating System Interface) threads. As a part of the portable programming model, user threads 62 are easily ported between data processing systems that implement the POSIX IEEE standard for operating systems services. A user process 60 accesses user threads 62 through a threads library. Each user thread 62 is in turn mapped to one of kernel threads 64 in an implementation-dependent manner.

Each kernel thread 64 comprises a schedulable unit of execution which resides in the user process address space within virtual memory. Each kernel thread 64 executes in the context of a user process 60 in either the kernel mode or user mode environment. As described above, a kernel thread 64 executes in kernel mode when invoking system calls or performing exception handling. Kernel thread 64 executes in user mode when performing user-level instructions within application software 42. In order to efficiently allocate CPU time slices, each kernel thread 64 inherits the priority and other attributes of the user process 60 under which kernel thread 64 executes.

The programming model depicted in FIG. 3 also includes kernel processes 68. Kernel processes 68 execute only in the kernel mode environment and are utilized by kernel 40 to support system resource functionality. For example, kernel processes 68 can be utilized to perform device management, including memory allocation, buffer management, and device driver support. For this reason, kernel processes are often loaded with device drivers into system unit 12. Each kernel process 68 is comprised of one or more kernel-only threads 66.

Figure 4:
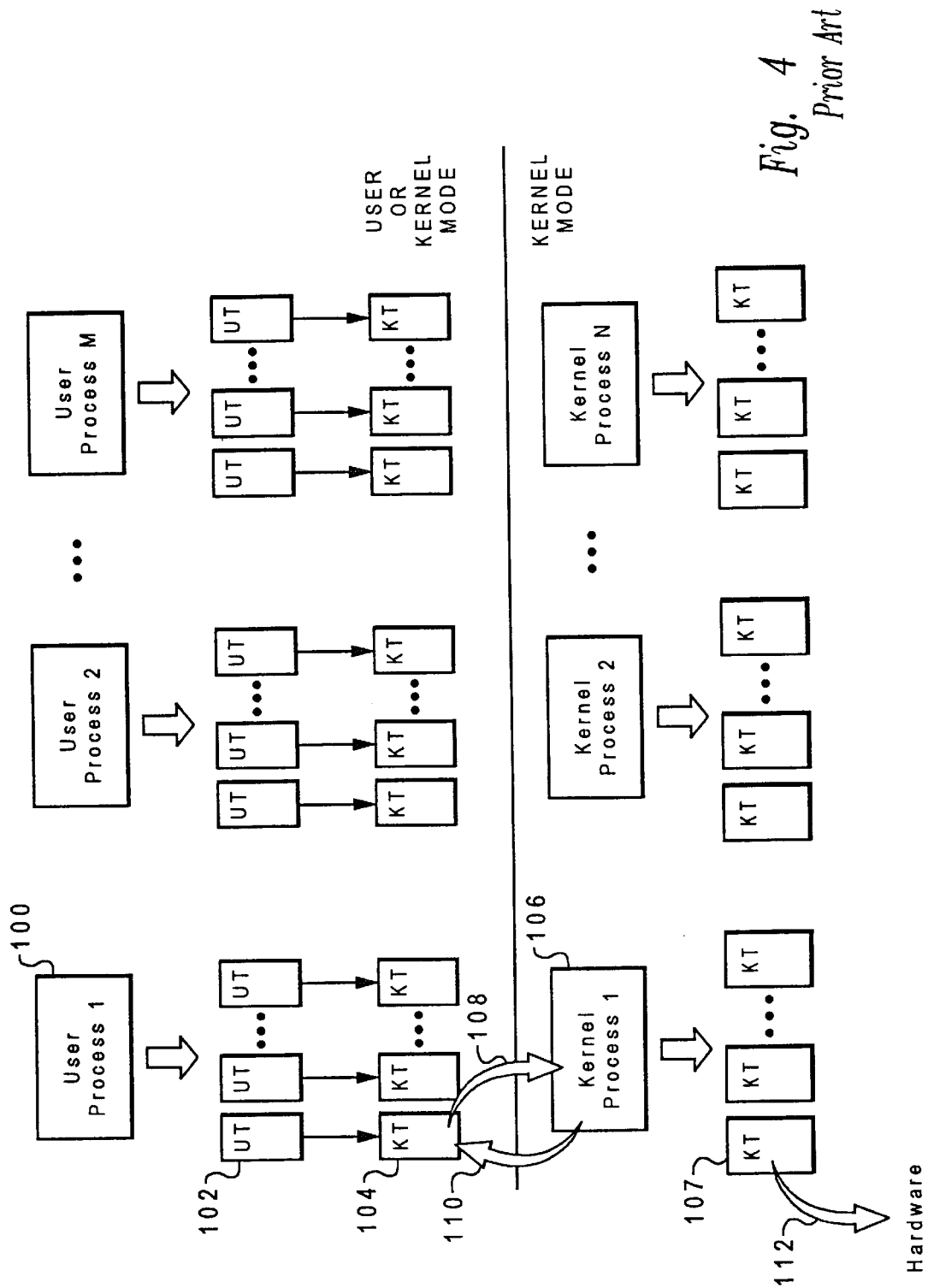
FIG. 4 depicts a conceptual diagram of a conventional multithreaded programming model.

In contrast to the conventional programming model illustrated in FIG. 4, kernel-only threads 66 can execute within the kernel mode environment in the context of either a user process 60 or a kernel process 68. An example of a kernel-only thread 66 executing within the context of a user process 60 will now be described with reference to an asynchronous read operation analogous to that previously described.

When executing instructions within application software 42, a kernel thread 64 operates within the user mode environment. Upon encountering an instruction which requires access to system resources, such as an asynchronous read, kernel thread 64 fills out a control block describing the asynchronous read operation. Kernel thread 64 then issues a system call and changes domains to the kernel mode environment. Within the kernel mode environment, kernel thread 64 issues a kernel service call 70 specifying the system resource access to be performed in kernel mode. As in prior art programming models, kernel service call 70 entails allocating a control block in kernel address space, filling out the control block, and placing the control block in a request queue. However, in contrast to conventional programming models, each of user processes 100 has a logically separate queue of system resource access requests. Thus, according to the present invention, kernel thread 64 places the control block in a request queue associated with user process 60.

In response to kernel service call 70, a kernel-only thread 66 is created under the context of user process 60. Kernel-only thread 66 then issues kernel service return 72, which enables kernel thread 64 to return to the user mode environment and continue execution. Like kernel thread 64 executing within the context of user process 60, kernel-only thread 66 inherits the attributes, including the priority, of user process 60. Based upon this priority, kernel-only thread 66 is scheduled by kernel 40 to execute on one of CPUs 30. As illustrated by arrow 74, kernel-only thread 66 then manages the asynchronous read operation by providing services such as sleep, wake up, and lock to the device driver that controls the disk hardware supplying the asynchronous data. Data read in from the disk is stored within the global kernel address space. Upon completion of the asynchronous read operation, kernel-only thread 66 copies the data from the kernel address space to the address space allocated to user process 60. Because kernel-only thread 66 executes under user process 60, the data path of the copy operation is simplified since obtaining a lock on a portion of user address space is unnecessary and fewer interfaces are required. Once the data is copied to the user address space of user process 60, kernel-only thread 66 alerts kernel thread 64 that the data is available by updating the status indicator within the control block of user process 60 and/or by issuing an interrupt.

The execution of kernel-only thread 66 within the context of user process 60 provides many scheduling, performance, and accounting benefits. First, because kernel-only thread 66 inherits the privileges and priority of the user process 60 under which kernel-only thread 66 executes, scheduling efficiency is improved since system resource accesses managed by kernel-only thread 66 will be performed according to the priority of kernel-only thread 66 (and user process 60), rather than a generic kernel process 68. Thus, if user process 60 is a high priority process, such as a root user, kernel-only thread 66 will also be granted high priority. Another scheduling benefit that results from the availability of kernel-only threads 66 executing in the context of user processes 60 is that each user process 60 maintains its own request queue for scheduling access to system resources. Having M separate queues not only enables a user process 60 to advance particular accesses to system resources within its queue, but also provides enhanced scheduling efficiency since M processes are available under which to run the kernel-only thread accessing the system resources.

Furthermore, the provision of kernel-only threads 66 in the context of user processes 60 promotes greater accountability of user processes 60 for the consumption of system resources. Since the programming model depicted in FIG. 3 no longer provides generic system processes for use by user processes 60, accesses to system resources are accounted against the user process 60 utilizing the system resources. The accountability provided by the present invention also affects scheduling priority in data processing systems which employ decaying process priorities since a thread's priority will decrease due to a parent process' consumption of CPU time during accesses to system resources. Thus, user processes 60 are no longer able to utilize "free" CPU time. The concept of user process accountability is particularly important in data processing systems which operate as servers for multiple client systems. By employing the programming model of the present invention, the utilization of the system resources provided by the server can be fairly charged to each of the client systems since generic system services are not available to user processes 60. Finally, data processing systems employing the present invention enjoy improved response time and throughput since the data paths are simplified and overall system overhead is reduced.

As has been described, the present invention provides an improved method and system for accessing system resources within a multitasking data processing system. Through implementing the programming model embodying the present invention, a data processing system can associate system resource accesses with the user processes initiating such accesses. Furthermore, the enhancement of the multitasking programming paradigm provided by the present invention improves the performance and functionality of system resource accesses while promoting greater user process accountability and providing desirable attribute inheritance.

While the invention has been particularly shown and described with reference to a preferred embodiment, it will be understood by those skilled in the art that various changes in form and detail may be made therein without departing from the spirit and scope of the invention.

What is claimed is:

1. A multitasking data processing system, comprising:
   system resources;
   a processor for executing kernel threads scheduled to said processor;
   a memory having a user address space and a kernel address space, wherein an application program is stored within said user address space;
   an operating system kernel stored within said kernel address space;
   a user process stored within said user address space which has ownership of said system resources, said user process including one or more first kernel threads which each comprise a schedulable unit of said application program, wherein in response to said processor processing an instruction within a particular first kernel thread which requires access to said system resources, said particular first kernel thread invokes a second kernel thread within said user process to access said system resources, said second kernel thread executing out of said kernel address space; and
   a thread scheduler for scheduling selected ones of said one or more first kernel threads and said second kernel thread to said processor for execution, wherein access to said system resources by said user process is accomplished by invoking a kernel thread within said user process.

2. The multitasking data processing system of claim 1, said user process having an attribute, wherein said second kernel thread within said user process inherits said attribute of said user process.

3. The multitasking data processing system of claim 2, wherein said attribute comprises a scheduling priority.

4. The multitasking data processing system of claim 1, wherein utilization of processor cycles by said second kernel thread within said user process is accounted to said user process.

5. The multitasking data processing system of claim 1, and further including a plurality of user processes and a plurality of queues for storing requests for system resource access, wherein each of said plurality of user processes maintains a respective one of said plurality of queues, and wherein system resource accesses indicated by requests in each queue are performed by a second kernel thread within a user process associated with said each queue.

6. A method within a multitasking data processing system for managing access to system resources by a user process, said data processing system including a memory having a user address space which stores an application program and a kernel address space which stores an operating system kernel, said method comprising:
   creating a user process within said user address space which has ownership of said system resources, said user process including a first kernel thread which comprises a schedulable unit of said application program;
   scheduling said first kernel thread to said processor for execution;
   in response to said processor processing an instruction within said first kernel thread which requires access to said system resources, creating a second kernel thread within said user process to perform said access to said system resources, wherein said second kernel thread executes out of said kernel address space; and
   thereafter, continuing execution of said first kernel thread within said user address space, wherein access to said system resources is accomplished by invoking a kernel thread within said user process.

7. The method for managing access to system resources by a user process of claim 6, and further comprising:
   executing said second kernel thread within said user process to access said system resources; and
   in response to completion of said access to said system resources, notifying said-first kernel thread that said access to said system resources is complete.

8. The method for managing access to system resources by a user process of claim 7, said user process having a scheduling priority, wherein said execution of said second kernel thread within said user process is performed according to said scheduling priority of said user process.

9. The method for managing access to system resources by a user process of claim 6, and further comprising accounting processor cycles utilized to execute said second kernel thread within said user process to said user process.

10. The method for managing access to system resources by a user process of claim 6, and further including a plurality of user processes, wherein each of said plurality of user processes maintains a separate queue of requests to perform system resource accesses, said method further comprising:
    in response to a request by thread within a particular user process among said plurality of user processes to perform an access to said system resources, placing said request on a queue of requests maintained by said particular user process.

11. A computer program product for managing access to system resources by a user process within a data processing system having a user address space which stores an application program and a kernel address space which stores an operating system kernel, said computer program product comprising:
    a data processing system usable medium;
    instruction means within said medium for causing said data processing system to create a user process within said user address space which has ownership of said system resources, said user process including a first kernel thread which comprises a schedulable unit of said application program;

instruction means within said medium for causing said data processing system to schedule said first kernel thread to said processor for execution;

instruction means within said medium for causing said data processing system to create a second kernel thread within said user process to perform said access to said system resources in response to said processor processing an instruction within said first kernel thread which requires access to said system resources, wherein said second kernel thread executes out of said kernel address space; and instruction means within said medium for causing said data processing system to thereafter continue execution of said first kernel thread within said user address space, wherein access to said system resources is accomplished by invoking a kernel thread within said user process.

12. The computer program product of claim 11, and further comprising:

instruction means within said medium for causing said data processing system to execute said second kernel thread within said user process to access said system resources; and instruction means within said medium for causing said data processing system to notify said first kernel thread that said access to said system resources is complete in response to completion of said access to said system resources.

13. The computer program product of claim 12, wherein said instruction means for causing said data processing system to execute said second kernel thread within said user process causes said data processing system to execute said second kernel thread within said user process according to a scheduling priority of said user process.

14. The computer program product of claim 11, and further comprising instruction means within said medium for causing said data processing system to account processor cycles utilized to execute said second kernel thread within said user process to said user process.

15. The computer program product of claim 11, said data processing system further including a plurality of user processes, wherein each of said plurality of user processes maintains a respective one of a plurality of queues for storing requests to perform a system resource access, said computer program product further comprising:

instruction means within said medium for causing said data processing system to place a request to perform an access to system resources on a queue of requests maintained by a particular user process among said plurality of user processes in response to a request by a first kernel thread within said particular user process to perform an access to said system resources.

16. The multitasking data processing system of claim 1, wherein said particular first kernel thread invokes said second kernel thread by issuing a kernel service call.

17. The method of claim 6, wherein invocation of said second kernel thread by said first kernel thread comprises said first kernel thread issuing a kernel service call.

18. The computer program product of claim 11, wherein said instruction means for causing said data processing system to create a second kernel thread within said user process comprises instruction means for causing said data processing system to create a second kernel thread within said user process in response to said first kernel thread issuing a kernel service call.

* * * * *